United States Patent [19]

Champoux

[11] 4,187,708
[45] Feb. 12, 1980

[54] PULLING APPARATUS AND METHOD

[75] Inventor: Louis A. Champoux, Seattle, Wash.

[73] Assignee: Industrial Wire & Metal Forming, Inc., Tukwila, Wash.

[21] Appl. No.: 786,096

[22] Filed: Apr. 11, 1977

[51] Int. Cl.² .......................................... B21D 39/08
[52] U.S. Cl. ................................ 72/30; 29/243.52; 72/453.16; 91/47; 173/169
[58] Field of Search ............ 72/391, 392, 393, 453.17, 72/453.2, 453.07, 453.19, 453.16, 370, 30; 29/243.52; 91/47; 173/169

[56] References Cited

U.S. PATENT DOCUMENTS

| | | | |
|---|---|---|---|
| 3,367,166 | 2/1968 | Newton | 72/453.17 |
| 3,523,441 | 8/1970 | Bell | 72/453.17 |
| 3,875,649 | 4/1975 | King | 29/243.52 |
| 3,892,121 | 7/1975 | Champoux | 29/243.52 |
| 3,902,405 | 9/1975 | Costarella | 92/246 |
| 3,994,208 | 11/1976 | Boyer | 92/240 |
| 4,005,598 | 2/1977 | Ehmann | 72/391 |
| 4,010,630 | 3/1977 | Davis | 72/391 |

FOREIGN PATENT DOCUMENTS 2153289  10/1971  Fed. Rep. of Germany ............ 92/170

*Primary Examiner*—Lowell A. Larson
*Assistant Examiner*—Gene P. Crosby
*Attorney, Agent, or Firm*—Morris A. Case

[57] ABSTRACT

A hand-tool housing a pneumatic and a hydraulic piston joined together with a common piston rod, and separated into an air chamber and a hydraulic chamber by a stationary divider through which the piston rod is sealed for free movement is used as a pulling device. Compressed air moves the puller to a starting position, and an air powered hydraulic unit supplies hydraulic pressure to effect the pulling cycle. Sequencing of the complete pulling cycle is controlled by a trigger actuated air valve mounted in the hand tool.

26 Claims, 6 Drawing Figures

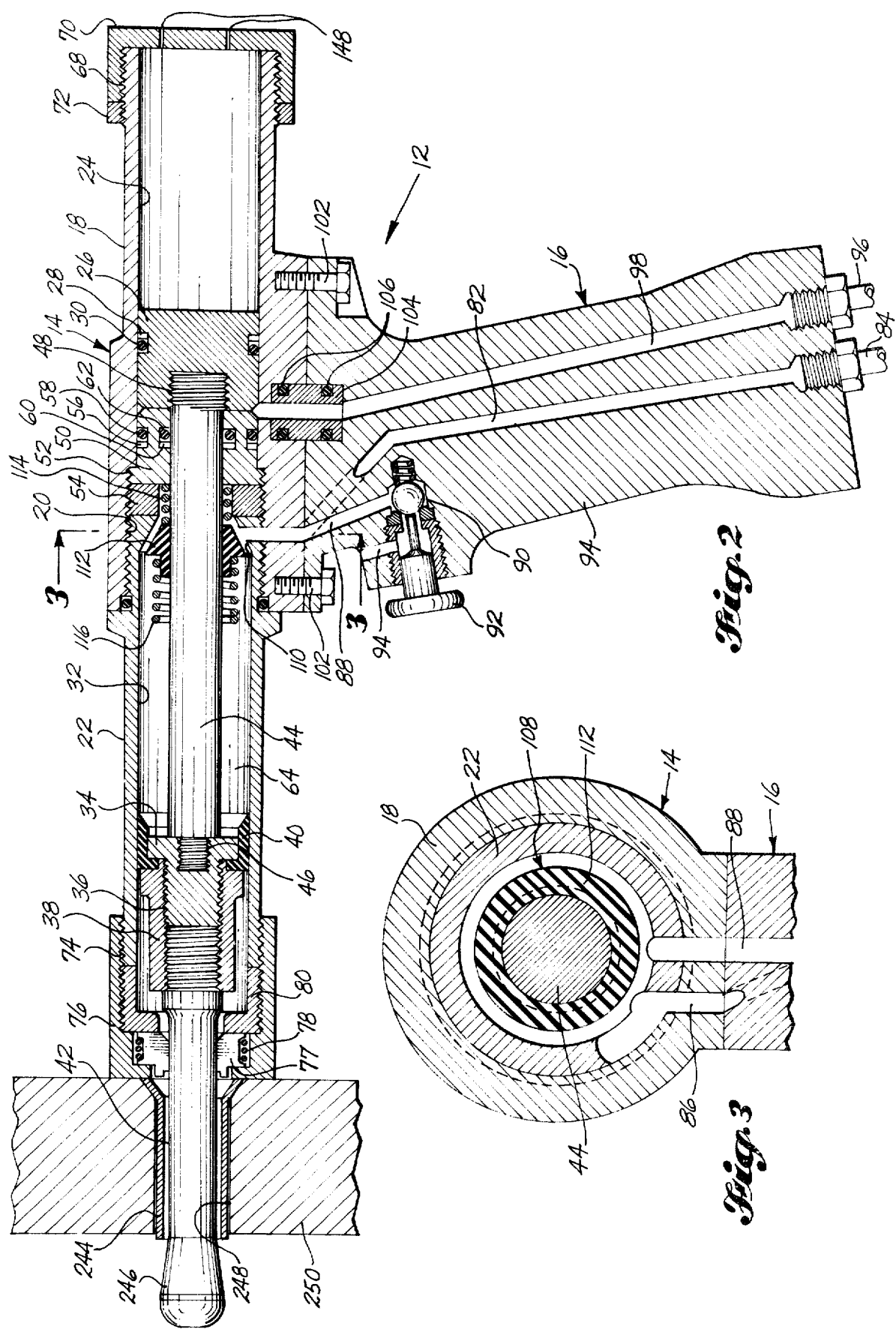

PULLING APPARATUS AND METHOD

BACKGROUND OF THE INVENTION

There are numerous types of pulling devices for pulling bolts and broaching holes, and broacher type equipment has been used for pulling mandrels to cold work holes. These pullers are heavy, require an air line for controlling a pneudraulic unit and another air line for returning the mandrel to starting position. When the hydraulic unit reaches the bottom of a stroke the hydraulic pressure builds up to maximum pressure capacity of the hydraulic pump; which requires a very heavy puller unit. The units do not automatically shut off at the end of a pulling stroke, therefore an operator tries to anticipate, and as a result turns the power off and on during a pulling cycle.

The power required for a pulling cycle can be very high. As high pressure is applied to a hydraulic cylinder the cylinder wall increases in diameter due to the elasticity of the material. The piston on the other hand does not expand radially at anything like the rate the cylinder expands. Therefore, the clearance between the piston and the cylinder increases with an increase in pressure and allows an O-ring seal to extrude in the gap, and result in a short seal life. The thickness of the cylinder wall may be increased to prevent this difficulty, but this adds to the weight of the hand-tool.

SUMMARY OF THE INVENTION

A hand-tool having a cylindrical barrel and a handle has a mandrel pulled by movement of a hydraulic piston mounted in the barrel and returned to a starting position by an air piston. The two pistons are joined by a common piston rod and are separated by a stationary member through which the piston rod sealingly extends to create a variable air compartment on one side and a variable hydraulic compartment on the other side. An air motor drives a hydraulic pump to actuate the puller and pump action is controlled by a trigger actuated air valve which starts the air motor when the trigger exhausts the air from the air compartment and shuts off the air motor and returns the mandrel to a starting position when the trigger actuated valve is closed. The hydraulic piston is recessed to form a wall which is expanded radially under pressure.

DESCRIPTION OF THE DRAWINGS

FIG. 2 shows a side elevational sectional view of the air-tool of this invention with the tool in the starting position.

FIG. 3 shows a sectional view taken along line 3—3 of FIG. 2.

FIG. 4 shows a fragmented sectional view of FIG. 2 with the tool in the pulled position.

DETAILED DESCRIPTION

Figure 1:
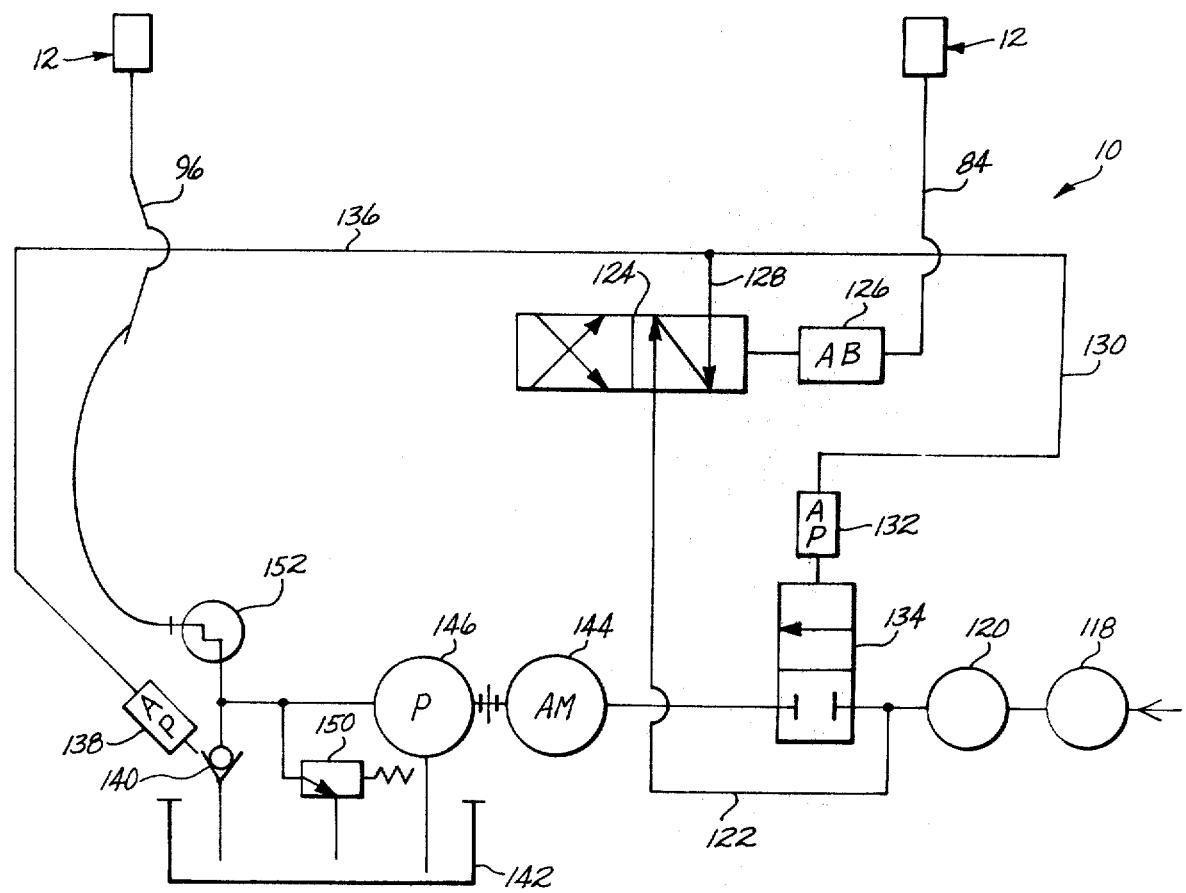
FIG. 1 shows a schematic of the apparatus of this invention.
Figure 1:
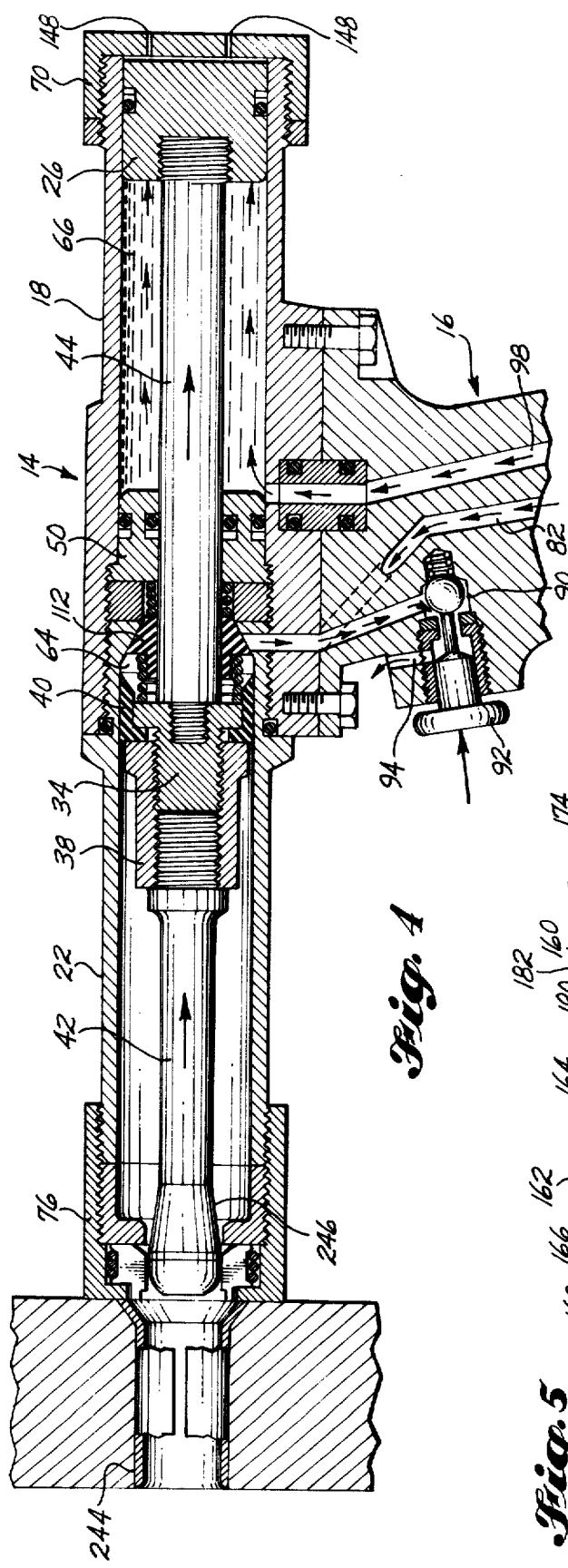

An apparatus 10, for cold working a hole has a hand-tool 12; which is made up of a cylindrical barrel or housing 14, and a pistol grip handle 16. The main portion of the housing is a hydraulic cylinder member 18; which is threaded at 20 to accept an air cylinder member 22. Slideably mounted within the hydraulic cylinder inside wall 24, is a hydraulic piston 26. This piston has a backup ring 28, and an O-ring seal 30 to effect a sealing engagement with the cylinder wall. Slideably mounted within the air cylinder inside wall 32, is a pneumatic piston 34; which is threaded at 36 to accept a threaded adapter 38. The adapter engages a cup seal 40, to secure the cup seal between the hydraulic piston and the adapter to effect a seal with the cylinder wall. The adapter is also used as a threaded means for securing a mandrel 42 to the pneumatic piston. A common piston rod or shaft 44, extends between the two pistons and is threadably attached to the pneumatic or air piston at 46, and to the hydraulic piston at 48. A stationary member 50; which acts as a separator or divider between the two cylinders has an annular extension 52; which abuts against the hydraulic cylinder 18, and is held in place with lock nut 54. The divider is sealed at the inside cylinder wall with a backup ring 56, and an O-ring 58, and is sealed to permit sliding engagement with the piston rod with backup ring 60, and O-ring 62. The divider, the rod and the two pistons separate the space within the cylinders into two variable compartments or chambers with a variable air compartment 64, and a variable hydraulic compartment 66. The hydraulic cylinder is threaded at 68, to accept an end cap 70, and lock nut 72. The air cylinder is threaded at 74, to accept nose cap 76. Contained within the nose cap are sleeve retaining jaws 77, with O-ring retainer 78, and jaw retainer nut 80.

The handle 16, has a channel 82, extending from a single air feed line 84, to a channel 86 in the hydraulic cylinder 18 leading directly into variable air compartment 64. An exhaust channel 88 extends from the air compartment to a normally closed valve 90; which is actuated by depressing trigger 92, to exhaust air from the air compartment through channel 94. A single hydraulic feed line 96, services channel 98; which extends directly to the variable hydraulic compartment 66. The handle 16 is joined to the cylindrical barrel 14 with bolts 102. An adapter 104 is placed between the cylinder and the handle to effect a seal between these two members with O-ring seals 106.

An automatic shut off valve 108 is located in the air compartment with valve seat 110 and valve plug 112. The valve plug encircles the piston rod 44, has spring 114 to keep the plug away from the valve seat for normal operation and a stronger spring 116 on the other side of the plug; which overcomes the weaker spring to seat the plug when the stronger spring is compressed by contact with the air piston 34 which condition takes place at the time the hydraulic piston bottoms out.

FIG. 1 shows the air and hydraulic system for feeding the hand-tool 12. A compressed air source, not shown, connects to a separator 118, to air filter 120, then through line 122 to a four way valve 124. This valve has an air bleed shown as 126; which permits the compressed air to bleed through a small hole to enter air feed line 84 leading to the hand-tool 12. As air pressure builds up in this line it will position the four way valve to exhaust air from line 128. Line 128 communicates through line 130 to air pilot 132; which positions and shuts off two way valve 134 when air exhausts from line 128. At the same time line 128 communicates through line 136 to air pilot 138 to open check valve 140. As air pressure continues to build up in air feed line 84 it enters air compartment 64, and acts against air piston 34 to move the mandrel 42 to the starting position while pushing hydraulic fluid out of the hydraulic compartment 66 through line 96 and into hydraulic fluid reservoir 142. With the mandrel in the starting position the trigger 92 is actuated or depressed which opens up valve 90 to exhaust air out of the air compartment to permit the air piston to be moved. At the same time air pressure drops in line 84 to reposition valve 124 and introduce compressed air through line 128 into lines 130 and 136 to open valve 134 and close valve 140. When valve 134 is opened air flows through the valve to air motor 144; which drives hydraulic pump 146. Since the check valve is now closed this permits the flow of hydraulic fluid to feed into variable hydraulic compartment 66 to drive the hydraulic piston and pull the mandrel. As the hydraulic piston bottoms out the automatic shut off valve; which is in series with and ahead of the trigger valve, allows pressure to build up in line 84 which shuts off the air driven hydraulic pump. The hydraulic pump is preferably a two stage pump with the first stage a high volume low pressure pump to rapidly move the mandrel, and a second stage low volume high pressure pump to take over near the end of the stroke to provide the power for pulling the mandrel through a hole to be worked. When the puller is operated without a load the hydraulic piston would move very rapidly and strike the end cap; so vent holes 148 are placed in the end cap to control the flow of air through these holes and air cushion movement of the hydraulic piston. The hydraulic system also has a pressure relief valve 150, and preferably has a swivel joint 152.

Figure 5:
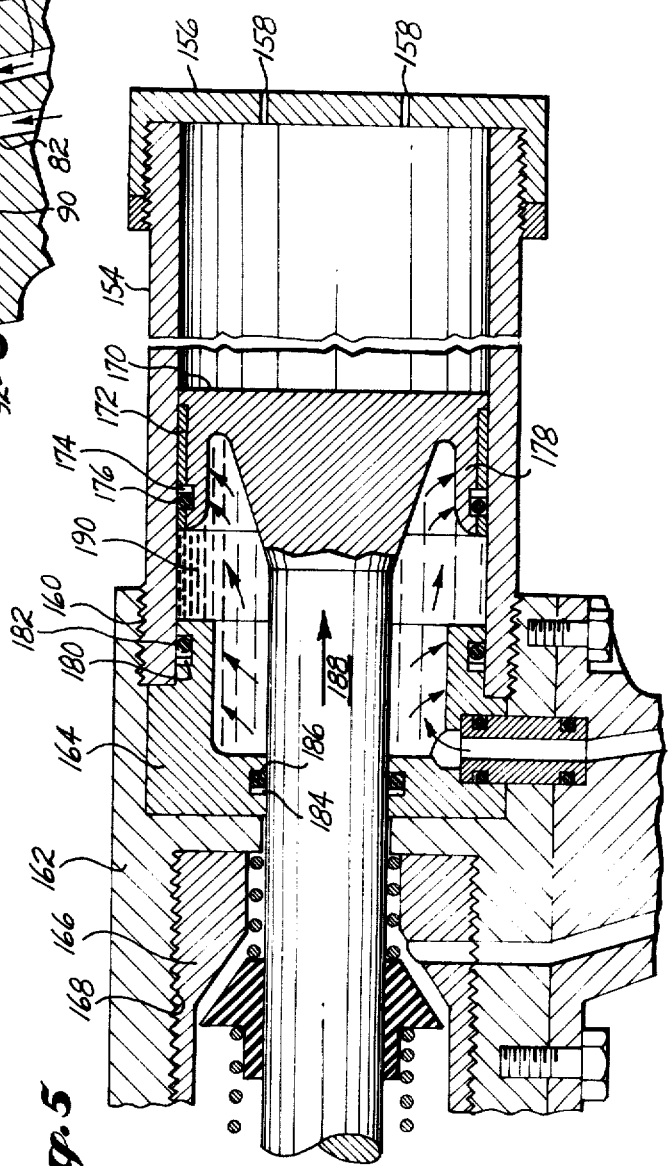
FIG. 5 shows an enlarged fragmented sectional view of a different embodiment of this invention.

In yet another embodiment as shown in FIG. 5, a hydraulic cylinder 154 with end cap 156 having vent holes 158 is threaded at 160 into adapter 162 to lock a divider member 164 in place, and a pneumatic cylinder 166 is threaded into the other side of the adapter at 168. A cup shaped hydraulic piston 170 has a low friction wear surface 172, and a backup ring 174 and O-ring seal 176 located under the cup wall 178. The divider is also cup shaped and has a backup ring 180 and an O-ring 182 sealing off the hydraulic cylinder, and a backup ring 184 and O-ring 186 to allow a slideable seal to a piston rod 188 which is connected to the hydraulic piston at one end and is connected at the other end to a pneumatic piston not shown. As high pressure hydraulic fluid enters hydraulic compartment 190, pressure on the wall of the cup shaped piston causes the piston to expand radially to equalize expansion of the piston and the cylinder wall to maintain an essentially constant distance between the piston and the cylinder in response to the pressure.

In the operation of a split sleeve cold working of a hole, see FIGS. 1, 2 and 4 the pulling apparatus 10 is connected to a compressed air line which introduces air into the air compartment 64 of the hand-tool 12 to shut off the hydraulic pump and to extend the mandrel into the starting position. A split sleeve 192 is then placed over an enlarged portion 194 of the mandrel 42 and moved to the sleeve retaining jaws. Next the mandrel with sleeve is inserted into a hole 196 of a work piece 198 to be cold worked with the nose piece 76 pressed against the work piece. The trigger is depressed which exhausts air from the air compartment, starts the hydraulic pump, closes the hydraulic check valve and fills the hydraulic compartment to pull the enlarged part of the mandrel through the hole to radially expand the material. The hand-tool is moved and the trigger released to build up pressure in the air compartment, shut off the hydraulic pump, open the hydraulic check valve to allow the air piston to move the gun to a starting position while reversing the flow of the hydraulic fluid. If the operator holds the trigger down after the hydraulic piston bottoms out the automatic shut off valve 108 shuts off the hydraulic pump and opens the hydraulic check valve.

Figure 6:
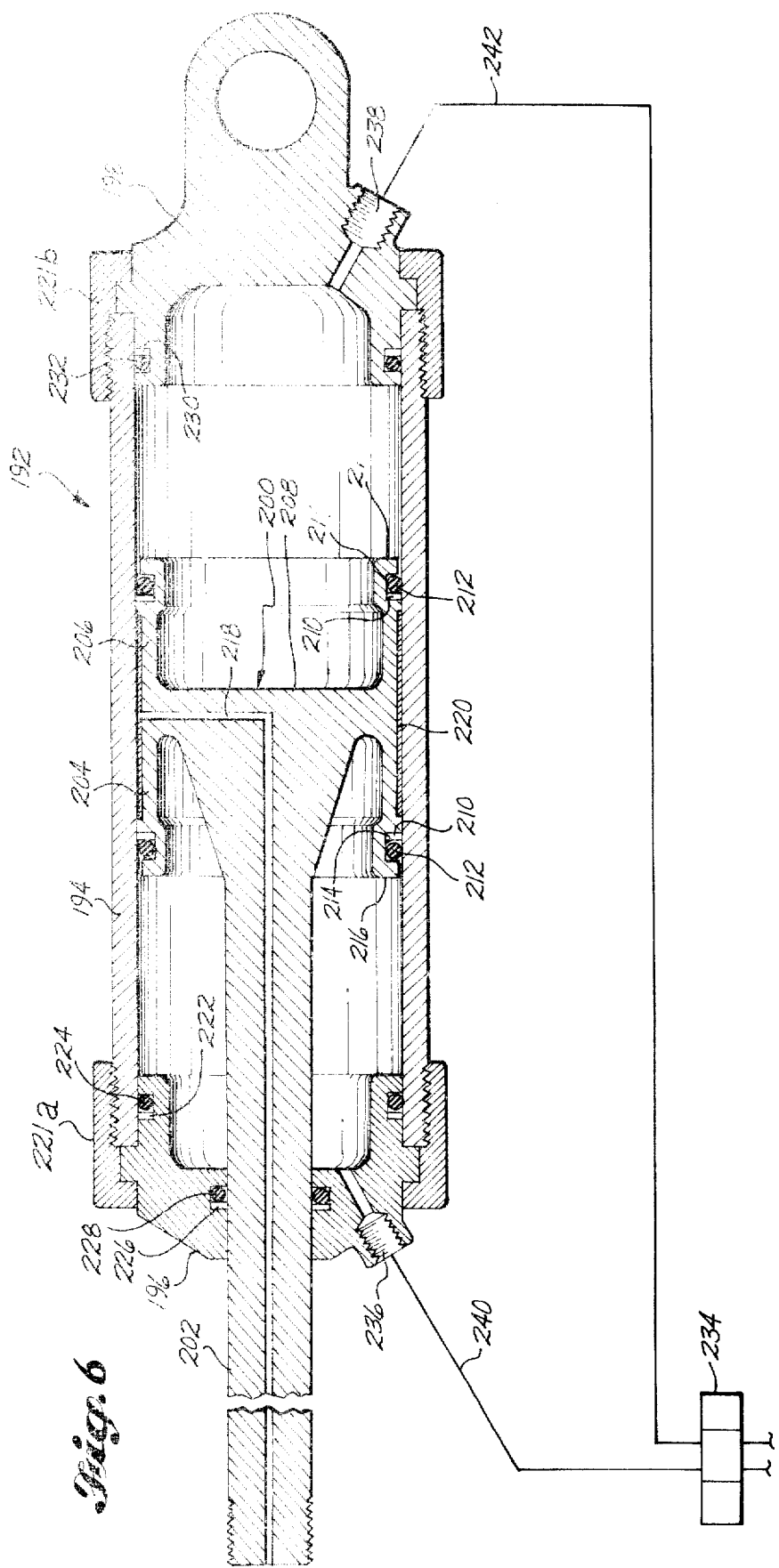
FIG. 6 shows a side elevational sectional view of a double acting cylinder as practiced by this invention.

FIG. 6 shows a high pressure double acting hydraulic cylinder with a hydraulic piston and both end caps shaped to equalize radial expansion with respect to a cylinder wall. A hydraulic cylinder 192 has a cylinder wall 194 that is enclosed by a pair of end caps 196 and 198, a hydraulic piston 200 slidingly mounted inside the cylinder wall and a piston rod 202 extends slidingly through one of the end caps and is joined to the piston. The piston is formed with a back to back double cup shape having a hollow cylinder with walls 204 and 206 extending from a centrally located member 208 which acts as a barrier between the two sides. A backup ring 210 and an O-ring 212 are located in an annular recess 214 near each end or lip 216 of the double cup shaped piston. A recess 218 first extends radially part way through the piston then axially out through the piston rod to act as a vent between the two O-ring seals. The piston also has an annular low friction wear ring 220. End caps 196 and 198 are fastened to the cylinder wall with adapters 221a and 221b respectively. End cap 196 is cup shaped inwardly, extends into the inside of the cylinder wall and has backup ring 222 and O-ring 224 for sealing with the wall. Backup ring 226 and O-ring 228 effect a seal between the end cap and piston rod 202. End cap 198 is also cup shaped inwardly to extend inside the cylinder wall and a seal is effected with that wall with backup ring 230 and O-ring 232.

The hydraulic cylinder is actuated by hydraulic pressure directed through 4-way valve 234. The cylinder has access connections 236 and 238, which are serviced by hydraulic lines 240 and 242 from the 4-way valve to control movement of the hydraulic piston. This cylinder uses light weight cylinder wall construction as the cup shaped piston and end cap members expand radially under pressure to maintain an essentially constant distance between those members and the wall of the cylinder.

I claim:

1. A pulling apparatus comprising: a cylindrical housing, a pair of sealed pistons slideably mounted inside the housing and joined to a common shaft, a stationary member inside the housing having an opening through which the shaft sealingly extends and with the stationary member acting as a divider, a working unit to move as the shaft with pistons move, means for introducing compressed air into a space between a first one of the pair of pistons and the divider to move the working unit to starting position, and means for exhausting air out of the space between the first piston and the divider and for introducing a hydraulic fluid under pressure into a space between a second one of the pair of pistons and the divider to pull on the working unit and perform work on a work piece.

2. A pulling apparatus as in claim 1, further comprising means for air cushioning and second piston during actuation by the hydraulic fluid.

3. A pulling apparatus as in claim 1, further comprising: means for automatically shutting off the hydraulic fluid pressure when the second piston bottoms out, and for allowing reverse flow of the hydraulic fluid.

4. A pulling apparatus as in claim 1, further comprising means for equalizing expansion of the second piston and of a cylinder wall of the cylindrical housing to maintain an essentially constant clearance between the piston and the cylinder wall in response to hydraulic pressure.

5. An apparatus for cold working a hole wherein a mandrel is actuated with a pneumatic, hydraulic puller to work the hole with the apparatus comprising: a pulling tool having a cylindrical barrel and a handle, an air actuated first piston and a hydraulic actuated second piston both located within the cylindrical barrel, a common shaft to extend between the two pistons, a stationary sealed divider through which the shaft extends, means for introducing compressed air into a space between the air piston and the divider to move a mandrel to starting position, means for exhausting the air from between the air piston and the divider, means for introducing hydraulic fluid into a space between the hydraulic piston and the divider to pull the mandrel through and cold work a hole, and means for reversing the flow of hydraulic fluid and for returning the mandrel to starting position.

6. An apparatus as in claim 5, further comprising means for air cushioning the hydraulic piston during the pull cycle.

7. An apparatus as in claim 5, further comprising means for equalizing expansion of the hydraulic piston and a wall of the cylindrical barrel to maintain an essentially constant clearance between the piston and the cylinder wall.

8. An apparatus as in claim 7, further comprising means for air cushioning the hydraulic piston during the pulling on the mandrel.

9. An apparatus as in claim 7, further comprising means for automatically shutting off hydraulic fluid upon completion of pulling the mandrel through the hole and for automatically allowing reverse flow of the hydraulic fluid.

10. An apparatus for cold working a hole by pulling a mandrel through the hole using a pulling tool powered by pneumatics and hydraulics, the apparatus comprising: a pulling tool having a cylindrical barrel and a handle; a single pneumatic line and a single hydraulic line to feed the pulling tool; a variable size air compartment within the barrel defined by a shaft, a cylinder wall, a sealed slideable air piston and a stationary divider through which the shaft sealingly extends; a variable size hydraulic compartment defined by the shaft, a cylinder wall, a sealed slideable hydraulic piston and the divider; means for introducing compressed air through the single pneumatic line into the variable size air compartment to move a mandrel into starting position; a trigger in the handle to be moved to an open position to exhaust the air compartment and initiate means for introducing hydraulic fluid under pressure, through the single hydraulic line, to the hydraulic compartment to pull the mandrel through the hole to be worked; and in response to movement of the trigger to a closed position, means for shutting off hydraulic pressure, for permitting reverse flow of the hydraulic fluid and for reentry of compressed air to the air compartment to return the mandrel to starting position.

11. An apparatus as in claim 10, further comprising means for air cushioning the hydraulic piston during a pull stroke.

12. An apparatus as in claim 10, further comprising means for shutting off the hydraulic fluid at the end of a pull stroke and means for automatically allowing reverse flow of hydraulic fluid.

13. An apparatus as in claim 10, further comprising means for maintaining an essentially constant distance between an outer periphery of the hydraulic piston and an inner wall of the cylinder.

14. An apparatus for pulling a mandrel to cold work a hole using a pneumatic, hydraulic actuated hand-tool, the apparatus comprising: a hand-tool having a cylindrical barrel and a handle; a piston rod located within the barrel; a pneumatic piston on one end of the piston rod and a hydraulic piston on the other end; a stationary member through which the piston rod sealingly extends, said stationary member to divide the cylinder into pneumatic and hydraulic compartments; a single air line attached to the hand-tool to feed the pneumatic compartment; a single hydraulic line attached to the hand-tool to feed the hydraulic compartment; means for providing compressed air to the air line to fill the pneumatic compartment and move a work mandrel to a starting position; a hydraulic pump driven by an air motor to provide hydraulic fluid to the hydraulic line; a trigger located in the handle to be depressed to exhaust air from the pneumatic compartment, to start the air driven hydraulic pump and thereby fill the hydraulic compartment and pull the mandrel through a hole to be cold worked, and said trigger when released to shut off the exhaust of air, and thereby build up pressure in the air line, to shut down the hydraulic pump, to allow the hydraulic fluid to flow in a reverse direction and to return the mandrel to a starting position.

15. An apparatus as in claim 14, further comprising means for automatically shutting off the hydraulic pump.

16. An apparatus as in claim 14, further comprising means for expanding the hydraulic piston as hydraulic pressure is applied.

17. An apparatus as in claim 14, further comprising the barrel having an opening sized to restrict a flow of air being moved by the hydraulic piston.

18. An apparatus as in claim 17, wherein the means for automatically shutting off the hydraulic pump comprises a valve in series with and located ahead of the trigger, said valve to be closed by contact with the air piston as the hydraulic piston bottoms out.

19. An apparatus as in claim 14, with the hydraulic piston having a cup shape to expand in response to hydraulic pressure to maintain an essentially constant distance between an outer periphery of the piston and an inner wall of the cylinder.

20. An apparatus as in claim 19, further comprising the barrel having an opening sized to restrict a flow of air being moved by the hydraulic piston.

21. An apparatus as in claim 19, wherein the hydraulic pump comprises a two stage pump, the first stage to provide a high volume low pressure to rapidly pull the mandrel to the hole and the second stage to provide a low volume high pressure to pull the mandrel through the hole.

22. A method of cold working a hole with a trigger controlled pneumatic, hydraulic actuated hand-tool, the steps comprising: utilizing an air driven hydraulic pump for supplying hydraulic fluid under pressure to a hydraulic compartment in a hand-tool for reacting against a divider in moving a hydraulic piston to pull a mandrel through a hole to be worked; introducing compressed air into an air compartment in the hand-tool for reacting against the divider in driving an air piston and moving the attached mandrel to a starting position; depressing a trigger in the hand-tool for opening an air valve and exhausting air from the air compartment with the loss of air pressure initiating introduction of compressed air for driving the hydraulic pump, and also initiating closing a check valve for permitting build up of the hydraulic pressure for pulling the mandrel; and releasing the trigger for closing the exhaust air valve with the air pressure build up shutting off air to air driven hydraulic pump, opening the check valve to permit reverse flow of the hydraulic fluid and pressurizing the air compartment to return the mandrel to starting position.

23. A method of cold working a hole as in claim 22, steps further comprising placing openings in the hand-tool for air cushioning movement of the hydraulic piston during the pulling on the mandrel.

24. A method of cold working a hole as in claim 22, further comprising placing a shut off valve, in series with and up stream of the trigger operated air valve and locating the shut off valve in the air compartment in a position for closing the valve by the air piston as the hydraulic piston bottoms out.

25. A method of cold working a hole as in claim 22 further comprising forming the hydraulic piston with a cup shape for equalizing expansion of the piston and an adjacent cylindrical wall for maintaining essentially constant distance between the piston and the cylinder wall in response to hydraulic pressure.

26. A method of cold working a hole with a trigger controlled pneumatic, hydraulic actuated hand-tool, the steps comprising: powering a mandrel on a hand-tool with an air actuated piston and a hydraulic actuated piston and joining the two pistons with a common piston rod, generating an air compartment and a hydraulic compartment by placing a stationary divider between the two pistons and movingly sealing the rod through the divider; utilizing an air driven hydraulic pump; introducing compressed air into the air compartment for moving the mandrel to a starting position; actuating a trigger for exhausting air from the air compartment, introducing air into the air driven hydraulic pump and closing a check valve for driving hydraulic fluid into the hydraulic compartment and pulling the mandrel through a hole to be worked; and releasing the trigger shutting off the exhaust of air, shutting down the air driven hydraulic pump, opening the check valve and returning the mandrel to the starting position.

* * * * *